A. A. HAZARD.
Seed-Planter.
No. 49,265.  Patented Aug. 8, 1865.
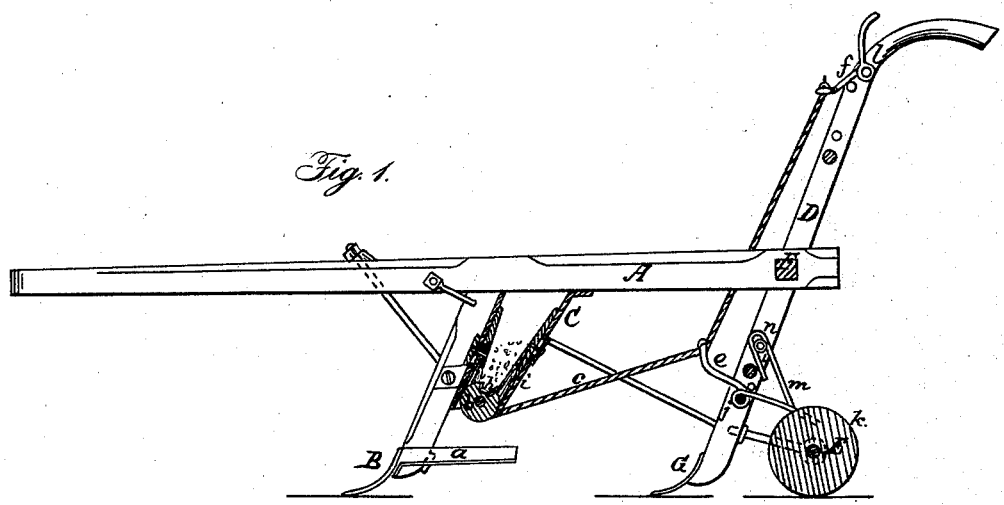
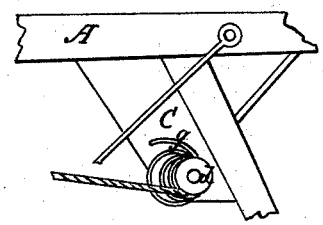
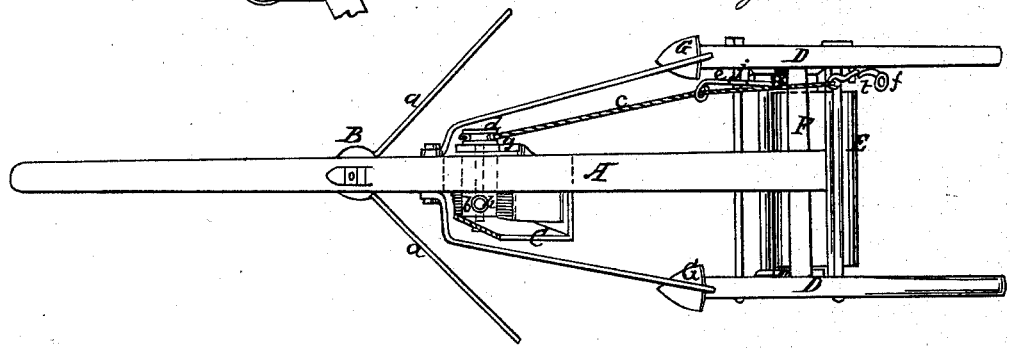
Witnesses:
Gustave Dittrich
Geo. W. Reed
Inventor:
A. A. Hazard

UNITED STATES PATENT OFFICE.

A. A. HAZARD, OF NEW YORK, N. Y.

IMPROVED CORN-PLANTER.

Specification forming part of Letters Patent No. 49,265, dated August 8, 1865.

*To all whom it may concern:*

Be it known that I, A. A. HAZARD, of the city, county, and State of New York, have invented a new and Improved Corn-Planter; and I do hereby declare that the following is a full, clear, and exact description of the same, reference being had to the accompanying drawings, making a part of this specification, in which—

Figure 1 represents a longitudinal vertical section of my invention. Fig. 2 is a plan or top view of the same. Fig. 3 is a detached side elevation of the hopper or seed-box.

Similar letters of reference indicate corresponding parts in three figures.

This invention relates to an improvement in that class of corn-planters in which the seed is distributed by the action of a roller with one or more seed-cells, to which an oscillating motion is imparted either by a trigger attached to one of the handles of the plow or by the action of a pin or cam projecting from the covering-roller, said seed-distributing roller being subjected to the action of a spring, which carries it back to its original position after each discharge of seed.

The nature of my invention and its peculiar advantages will be readily understood from the following description.

A represents a beam similar to an ordinary plow-beam, and made of wood or other suitable material. Secured to this beam at about the middle of its length is the furrow-opener B, which consists of a common plowshare provided with two flaring wings, *a*, which serve to throw stones or other obstructions out of the way, and to keep the track clear for the seed distributing and covering mechanism.

The seed is carried in a box or hopper, C, which is secured to the under side of the beam A, either close behind or at a little distance from the standard which carries the furrow-opener B. This box is provided with a roller, *b*, the axle or trunnions of which have their bearings in the sides of said box at or near their lower edges, and to which an oscillating motion is imparted by a cord, *c*, which extends from a pulley, *d*, to a lever, *e*, and thence to a trigger, *f*. The pulley *d* is secured to one end of the axle of the seed-roller, and a spring, *g*, which is secured with one end to the seed-box and with the other to the pulley *d*, carries the seed-roller back to its original position whenever the cord *c* is relieved from the strain. Said seed-roller is provided with one or more seed-cells, *h*, and if it is at rest, or in that position which it assumes by the action of the spring *g*, said seed cell or cells are on the top and in position to take seed.

If the seed-roller rotates by the action of the lever *e* or trigger *f*, the surplus seed is swept off from the seed-cell by the action of brushes *i*, and the contents of the said cell are deposited in the furrow opened by the plow B.

The lever *e* has its fulcrum on a pin, *j*, inserted into the lower part of one of the handles D D', and it is operated by the action of a cam or tappet, K, projecting from the end of the covering-roller E, and the trigger *f* has its fulcrum on a pivot, *l*, inserted into the upper part of the handle D, so that it can be operated with the same hand which holds said handle. Both the lever *e* and trigger *f*, as soon as released, are carried back to their original position by the action of the spring on the seed-roller.

The handles D D' are secured to a cross-bar, F, inserted in the end of the beam A, and they carry at their bottom ends the covering shares G.

The covering-roller E has its bearings in hangers *m*, which are secured to the lower ends of the handles, and made adjustable up and down by means of screws *n* passing through slots *o*, so that the roller can be raised or lowered at pleasure.

The seed from the seed-box can thus be distributed either by the action of the covering roller E, the circumference of which must be equal to the distance of the hills to be planted, or by the action of the trigger, which is actuated at the desired intervals by the operator, and after the seed has been deposited it is covered up by the shares G, and the ground is smoothed and pressed by the covering-roller E, and left in the best possible growing condition.

What I claim as new, and desire to secure by Letters Patent, is—

The oscillating and distributing roller *b*, in combination with the furrow-opener B, track-clearing wings *a*, spring *g*, lever *e*, trigger *f*, handles D D', and adjustable covering-roller E, all constructed and operating in the manner and for the purpose herein shown and described.

A. A. HAZARD.

Witnesses:
 GEO. W. REED,
 M. M. LIVINGSTON.